US012724299B2

(12) United States Patent
Hara et al.

(10) Patent No.: US 12,724,299 B2
(45) Date of Patent: Sep. 1, 2026

(54) OPTICAL MODULATOR, LIGHT SOURCE MODULE, OPTICAL ENGINE, AND XR GLASSES

(71) Applicant: TDK CORPORATION, Tokyo (JP)

(72) Inventors: Hiroki Hara, Tokyo (JP); Yasuhiro Takagi, Tokyo (JP); Atsushi Shimura, Tokyo (JP); Jiro Yoshinari, Tokyo (JP)

(73) Assignee: TDK CORPORATION, Tokyo (JP)

( * ) Notice: Subject to any disclaimer, the term of this patent is extended or adjusted under 35 U.S.C. 154(b) by 287 days.

(21) Appl. No.: 18/409,030

(22) Filed: Jan. 10, 2024

(65) Prior Publication Data

US 2024/0329437 A1 Oct. 3, 2024

(30) Foreign Application Priority Data

Mar. 31, 2023 (JP) ................................ 2023-057698

(51) Int. Cl.
*G02F 1/035* (2006.01)
*G02B 27/01* (2006.01)
(Continued)

(52) U.S. Cl.
CPC ......... *G02F 1/035* (2013.01); *G02B 27/0172* (2013.01); *G02F 1/0316* (2013.01);
(Continued)

(58) Field of Classification Search
None
See application file for complete search history.

(56) References Cited

U.S. PATENT DOCUMENTS 5,689,597 A * 11/1997 Besse .................. G02B 6/2813 385/47
5,802,222 A * 9/1998 Rasch ................ G02B 26/0808 385/9
(Continued)

FOREIGN PATENT DOCUMENTS

JP 2008-241937 A 10/2008
JP 2014-112168 A 6/2014
(Continued)

OTHER PUBLICATIONS

English translation of Jun. 16, 2026 Office Action issued in Japanese Patent Application No. 2023-057698.

*Primary Examiner* — Shan Liu
(74) *Attorney, Agent, or Firm* — Oliff PLC

(57) ABSTRACT

An optical modulator is a Mach-Zehnder-type optical modulator having a substrate and an optical waveguide layer including a lithium niobate film formed on the substrate. The optical waveguide layer includes a plurality of flat portions and n ridge portions arranged between the flat portions to be adjacent, where n is two or more. Each of the n ridge portions includes a main waveguide to which visible light is input, a first multimode interference waveguide through which the main waveguide is branched into a first and a second optical branch waveguide, and a second multimode interference waveguide through which the first and the second optical branch waveguide are coupled to form a coupling waveguide. Visible light beams having different wavelengths are input to the n ridge portions. The first multimode interference waveguide and the second multimode interference waveguide have shorter lengths when input light having a longer wavelength is transmitted.

7 Claims, 11 Drawing Sheets

(51) Int. Cl.

| | |
|---|---|
| ***G02F 1/03*** | (2006.01) |
| ***G02F 1/21*** | (2006.01) |
| ***G02F 1/225*** | (2006.01) |

(52) U.S. Cl.

CPC .............. *G02F 1/212* (2021.01); *G02F 1/225* (2013.01); *G02B 2027/0178* (2013.01)

(56) References Cited

U.S. PATENT DOCUMENTS

| | | | | |
|---|---|---|---|---|
| 2017/0052423 | A1* | 2/2017 | Okamoto ........... | G02B 27/0172 |
| 2017/0052424 | A1* | 2/2017 | Iwatsuka ................ | G02B 6/122 |
| 2022/0060260 | A1 | 2/2022 | Fukuzawa et al. | |

FOREIGN PATENT DOCUMENTS

| | | | |
|---|---|---|---|
| JP | 6728596 | B2 | 7/2020 |
| JP | 2022-036928 | A | 3/2022 |
| JP | 2022-085179 | A | 6/2022 |
| WO | 2018/216249 | A1 | 11/2018 |
| WO | 2023/007753 | A1 | 2/2023 |

* cited by examiner 1
32a
32R(32)
32G(32)
32B(32)
4a
32c
32b
52
61
62
A
A'
4b
32d
32c
32d
32b

OPTICAL MODULATOR, LIGHT SOURCE MODULE, OPTICAL ENGINE, AND XR GLASSES

BACKGROUND OF THE INVENTION

Field of the Invention

The present invention relates to an optical modulator, a light source module, an optical engine, and XR glasses.

The present application claims priority on Japanese Patent Application No. 2023-057698 filed on Mar. 31, 2023, the content of which is incorporated herein by reference.

Description of Related Art

In recent years, a light source module having an optical modulator to which light is input from a laser diode (a semiconductor laser) has attracted attention. This light source module can be used in optical engines in glasses-type terminals such as XR glasses such as augmented reality (AR) glasses and virtual reality (VR) glasses, small projectors, and the like.

For example, an image display device is described in Patent Document 1 and the image display device includes: a light source portion configured to output first light and second light; an optical modulator having a modulation portion of a Mach-Zehnder-type modulation method; and an optical scanner configured to spatially scan the first light and the second light optically modulated by the optical modulator.

Also, Patent Document 1 describes a head-mounted display attached to a user's head as the image display device.

Also, a transmitting device is disclosed in Patent Document 2, and the transmitting device includes: a laser light source configured to output visible light; and an optical modulator configured to generate a visible light signal by changing an intensity of the visible light. Patent Document 2 discloses a Mach-Zehnder-type optical modulator including a substrate, an optical waveguide layer, a buffer layer, and an electrode layer, wherein the optical waveguide layer includes a lithium niobate film. Also, Patent Document 2 discloses that an electrode including a first signal electrode, a second signal electrode, a first ground electrode, a second ground electrode, and a third ground electrode is used as the electrode layer of the optical modulator.

However, in the conventional optical modulator for visible light, it is necessary to further reduce optical loss so that the light emitted from the light source can be used efficiently.

PATENT DOCUMENTS

[Patent Document 1] Japanese Patent No. 6728596

[Patent Document 2] Japanese Unexamined Patent Application, First Publication No. 2022-036928

SUMMARY OF THE INVENTION

The present invention has been made in view of the above-described problems and an objective of the present invention is to provide an optical modulator for visible light with reduced optical loss, a light source module with reduced optical loss, and an optical engine and XR glasses equipped therewith.

In order to solve the above problems and further implement an optical modulator for visible light with reduced optical loss, in a Mach-Zehnder-type optical modulator having an optical waveguide layer including a plurality of ridge portions formed of a lithium niobate film on a substrate, an in-depth study has been made by the present inventors as shown below in consideration of relationships between lengths of a multimode interference waveguide through which a waveguide of each ridge portion is branched into two waveguides and a multimode interference waveguide to which the two branch waveguides are coupled and a wavelength of visible light input to each ridge portion.

That is, the optical loss in the multimode interference waveguide varies depending on the wavelength of light transmitted through the multimode interference waveguide and the length of the multimode interference waveguide. Also, as the wavelength of the light transmitted through the multimode interference waveguide decreases, a change in optical loss due to a change in the length of the multimode interference waveguide increases. Therefore, when visible light is transmitted to the multimode interference waveguide, the change in optical loss due to a change in the length of the multimode interference waveguide is remarkable as compared with the case where infrared lights having a wavelength longer than that of visible light are transmitted.

On the basis of these findings, the present inventors input a plurality of light beams having different wavelengths to a multimode interference waveguide and examined a relationship between the length of the multimode interference waveguide and the optical loss for light of each wavelength. As a result, it was found that the longer the wavelength of the input light, the shorter the length of the multimode interference waveguide with minimized optical loss. From this, the present inventors discovered that the optical loss of an optical modulator can be reduced by reducing the lengths of a multimode interference waveguide through which a waveguide provided in each ridge portion is branched into two waveguides and a multimode interference waveguide to which the two branch waveguides are coupled as input light having a longer wavelength is transmitted and hence conceived the present invention.

To achieve the above-described objective, the following features are provided.

According to an aspect of the present invention, there is provided an optical modulator, which is a Mach-Zehnder-type optical modulator including: a substrate; and an optical waveguide layer including a lithium niobate film formed on the substrate, wherein the optical waveguide layer includes a plurality of flat portions and n ridge portions arranged between the flat portions to be adjacent, where n is an integer of two or more, wherein each of the n ridge portions includes a main waveguide to which visible light is input, a first multimode interference waveguide through which the main waveguide is branched into a first optical branch waveguide and a second optical branch waveguide, and a second multimode interference waveguide through which the first optical branch waveguide and the second optical branch waveguide are coupled to form a coupling waveguide, wherein visible light beams having different wavelengths are input to the n ridge portions, and wherein the first multimode interference waveguide and the second multimode interference waveguide have shorter lengths when input light having a longer wavelength is transmitted.

The optical waveguide layer of the optical modulator of the present invention includes the plurality of flat portions and the n ridge portions arranged between the flat portions to be adjacent, where n is an integer of two or more. Visible light beams having different wavelengths are input to the n ridge portions. The first multimode interference waveguide and the second multimode interference waveguide provided in the n ridge portions have shorter lengths when input light having a longer wavelength is transmitted. Thus, as compared with a case where lengths of the first multimode interference waveguide and the second multimode interference waveguide provided in the n ridge portions are the same, for example, the optical modulator of the present invention has reduced optical loss.

Also, because a light source module of the present invention and an optical engine and XR glasses equipped therewith include the optical modulator of the present invention, the optical loss is reduced.

BRIEF DESCRIPTION OF THE DRAWINGS

FIG. 1B is a cross-sectional view of the optical modulator shown in FIG. 1A cut along line A-A' shown in FIG. 1A.

FIG. 4A is a plan view for describing an optical modulator of a third embodiment.

FIG. 5A is a plan view for describing an optical modulator of a fourth embodiment, wherein the optical modulator of the present embodiment is a Mach-Zehnder-type (MZI type) optical modulator.

DETAILED DESCRIPTION OF THE INVENTION

Figure 1A:
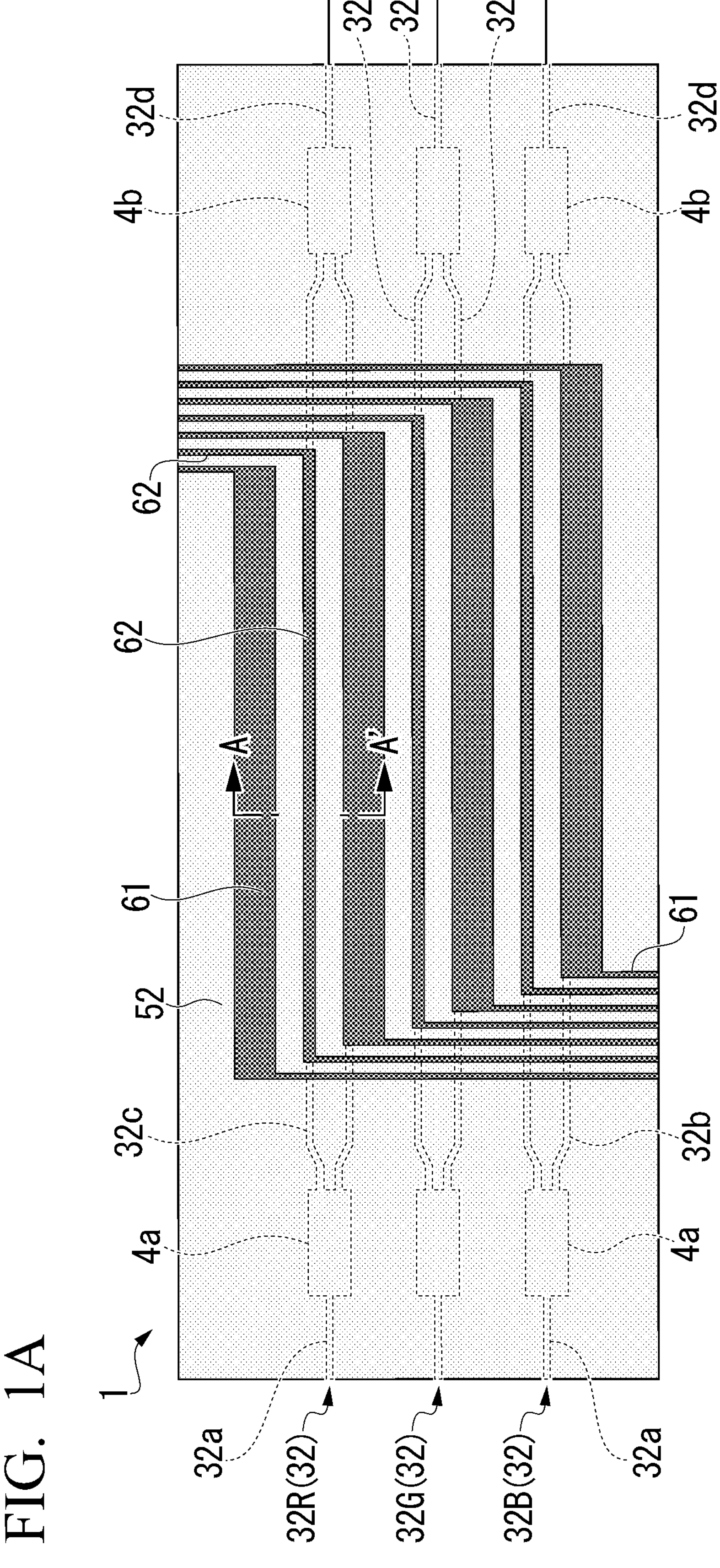
FIG. 1A is a plan view for describing an optical modulator of a first embodiment.

The present invention includes the following aspects.

[1] An optical modulator, which is a Mach-Zehnder-type optical modulator including: a substrate; and an optical waveguide layer including a lithium niobate film formed on the substrate, wherein the optical waveguide layer includes a plurality of flat portions and n ridge portions arranged between the flat portions to be adjacent, where n is an integer of two or more, wherein each of the n ridge portions includes a main waveguide to which visible light is input, a first multimode interference waveguide through which the main waveguide is branched into a first optical branch waveguide and a second optical branch waveguide, and a second multimode interference waveguide through which the first optical branch waveguide and the second optical branch waveguide are coupled to form a coupling waveguide, wherein visible light beams having different wavelengths are input to the n ridge portions, and wherein the first multimode interference waveguide and the second multimode interference waveguide have shorter lengths when input light having a longer wavelength is transmitted.

[2] The optical modulator according to [1], wherein n is 3.

[3] The optical modulator according to [1], wherein an electrode layer is provided on the optical waveguide layer, wherein the electrode layer includes a plurality of ground electrodes having a belt shape in a plan view and a plurality of signal electrodes having a belt shape in the plan view, wherein the ground electrode is arranged at a position overlapping the first optical branch waveguide in the plan view, and wherein the signal electrode is arranged at a position overlapping the second optical branch waveguide in the plan view.

[4] The optical modulator according to [1], wherein an electrode layer is provided on the optical waveguide layer, wherein the electrode layer includes a plurality of first signal electrodes having a belt shape in a plan view and a plurality of second signal electrodes having a belt shape in the plan view, wherein the first signal electrode is arranged at a position overlapping the first optical branch waveguide in the plan view, and wherein the second signal electrode is arranged at a position overlapping the second optical branch waveguide in the plan view.

[5] The optical modulator according to [1], further including a waveguide circuit to which coupling waveguides of the n ridge portions are coupled on the substrate to form an output waveguide.

[6] A light source module including:

the optical modulator according to [1] to [5]; and a light source configured to output visible light input to the main waveguide of the optical modulator.

[7] An optical engine including the light source module according to [6].

[8] XR glasses including the light source module according to [6].

Hereinafter, an optical modulator, a light source module, an optical engine, and XR glasses of the present embodiments will be described in detail with reference to the drawings as appropriate. In the drawings used in the following description, featured parts may be enlarged for convenience such that the features of the present invention are easier to understand, and dimensional ratios and the like of the respective components may be different from actual ones. Materials, dimensions, and the like exemplified in the following description are examples, the present invention is not limited thereto, and modifications can be appropriately made in a range in which advantageous effects of the present invention are exhibited.

[Optical Modulator]

First Embodiment

Figure 1B:
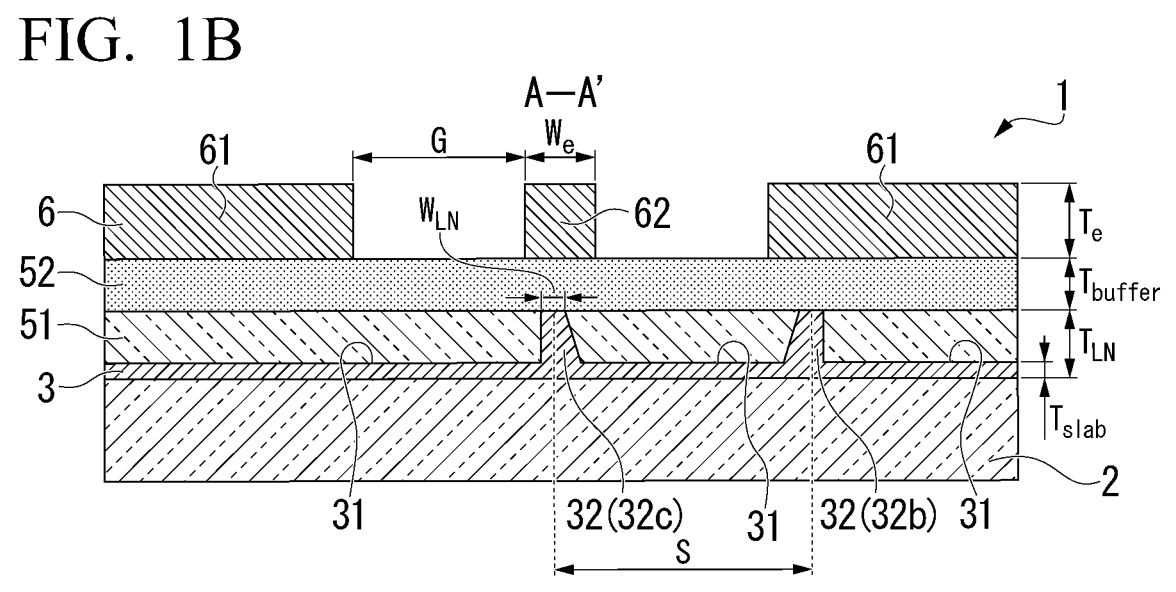

FIG. 1A is a plan view for describing an optical modulator of a first embodiment. FIG. 1B is a cross-sectional view cut along line A-A' shown in FIG. 1A.

The optical modulator 1 of the present embodiment is a Mach-Zehnder-type (MZI type) optical modulator. As shown in FIGS. 1A and 1B, the optical modulator 1 of the present embodiment includes a substrate 2, an optical waveguide layer 3 formed on the substrate 2, a protective layer 51, a buffer layer 52, and an electrode layer 6.

(Substrate 2)

It is only necessary for the substrate 2 to have a lower refractive index than the lithium niobate film forming the optical waveguide layer 3 and the substrate 2 is not particularly limited. The substrate 2 is preferably one on which a lithium niobate film can be formed as an epitaxial film.

As the substrate 2, for example, a single-crystal sapphire substrate, a single-crystal silicon substrate, an aluminum oxide ($Al_2O_3$) single-crystal substrate, or the like can be used, and a single-crystal sapphire substrate is used preferably.

(Optical Waveguide Layer 3)

The optical waveguide layer 3 is made of a lithium niobate film. Lithium niobate forming the lithium niobate film may include elements other than lithium (Li), niobium (Nb), and oxygen (O).

The lithium niobate may be, for example, a compound represented by the following Expression (I).

$$Li_xNbA_yO_z \quad (I)$$

(In Expression (I), A denotes an element other than Li, Nb, and O. x denotes a number of 0.5 or more and 1.2 or less. y denotes a number of 0 or more and 0.5 or less. z denotes a number of 1.5 or more and 4.0 or less.)

In Expression (I), it is only necessary for A to be an element other than Li, Nb, and O. Examples of A can include K, Na, Rb, Cs, Be, Mg, Ca, Sr, Ba, Ti, Zr, Hf, V, Cr, Mo, W, Fe, Co, Ni, Zn, Sc, Ce, and the like. A may be only one, two, or more selected from these elements.

In Expression (I), x denotes a number of 0.5 or more and 1.2 or less, preferably a number of 0.9 or more and 1.05 or less. y denotes a number of 0 or more and 0.5 or less. z denotes a number of 1.5 or more and 4.0 or less, preferably a number of 2.5 or more and 3.5 or less.

The lithium niobate film forming the optical waveguide layer 3 may be an epitaxial film.

The epitaxial film made of lithium niobate is a single-crystal film in which a crystal orientation is aligned by causing it to grow on the substrate 2. That is, the epitaxial film is a film having a single-crystal orientation in a film thickness direction and a film plane direction and the crystals are aligned and oriented in an X-axis direction, a Y-axis direction, and a Z-axis direction when the film plane is an X-Y plane and the film thickness direction is a Z-axis.

Whether or not the lithium niobate film forming the optical waveguide layer 3 is an epitaxial film can be proved, for example, by confirming a peak intensity and a pole at an orientation position in 2θ-θ X-ray diffraction.

The optical waveguide layer 3 includes a plurality of flat portions 31 and n ridge portions 32 arranged between flat portions to be adjacent 31 and having a raised, belt-like shape from the flat portion 31. In the optical modulator 1 of the present embodiment, the main waveguide 32*a* to be described below, a first multimode interference (MMI) waveguide 4*a* and a second multimode interference waveguide 4*b* which are branched from the main waveguide 32*a*, and a coupling waveguide 32*d* to which they are coupled are combined to form one ridge portion 32.

The number n of the ridge portion 32 is an integer of 2 or more, and can be, for example, three (n=3) as shown in FIG. 1A. Visible light beams having different wavelengths are input to the three ridge portions 32R, 32G, and 32B.

In the present embodiment, for example, red light having a peak wavelength of 610 nm or more and 750 nm or less is input to the ridge portion 32R. For example, green light having a peak wavelength of 500 nm or more and 560 nm or less is input to the ridge portion 32G. For example, blue light having a peak wavelength of 435 nm or more and 480 nm or less is input to the ridge portion 32B. Because the optical modulator 1 of the present embodiment has the three ridge portions 32R, 32G, and 32B to which red light, green light, and blue light are input, respectively, it can preferably be used, for example, for XR glasses that can display a full-color image and the like.

Each of the three ridge portions 32R, 32G, and 32B has the main waveguide 32*a*, the first multimode interference (MMI) waveguide 4*a*, the second multimode interference waveguide 4*b*, and the coupling waveguide 32*d* as shown in FIG. 1A. The first multimode interference waveguide 4*a* and the second multimode interference waveguide 4*b* provided in each of the ridge portions 32R, 32G, and 32B are the same and are arranged so that an input light transmission direction becomes an opposite direction.

In the three ridge portions 32R, 32G, and 32B of the optical waveguide layer 3, the main waveguide 32*a* is rectangular in a cross-sectional view and visible light generated by a light source such as a laser element is input. As shown in FIG. 1A, the main waveguide 32*a* is branched into the first optical branch waveguide 32*b* and the second optical branch waveguide 32*c* by the first multimode interference waveguide 4*a*. The first optical branch waveguide 32*b* and the second optical branch waveguide 32*c* are trapezoidal in the cross-sectional view as shown in FIG. 1B. The first optical branch waveguide 32*b* and the second optical branch waveguide 32*c* in the present embodiment are isomorphic in the cross-sectional view. As shown in FIG. 1A, the first optical branch waveguide 32*b* and the second optical branch waveguide 32*c* are coupled through the second multimode interference waveguide 4*b* to form the coupling waveguide 32*d*. The coupling waveguide 32*d* is substantially rectangular in the cross-sectional view and outputs a visible light signal generated in the second multimode interference waveguide 4*b*.

The cross-sectional shapes of the main waveguide 32*a* and the coupling waveguide 32*d* are not limited to a rectangular shape, but may be, for example, a trapezoidal shape or a semicircular shape.

Also, the cross-sectional shapes of the first optical branch waveguide 32*b* and the second optical branch waveguide 32*c* are not limited to a trapezoidal shape, and may be, for example, a rectangular or semicircular shape.

Figure 2A:
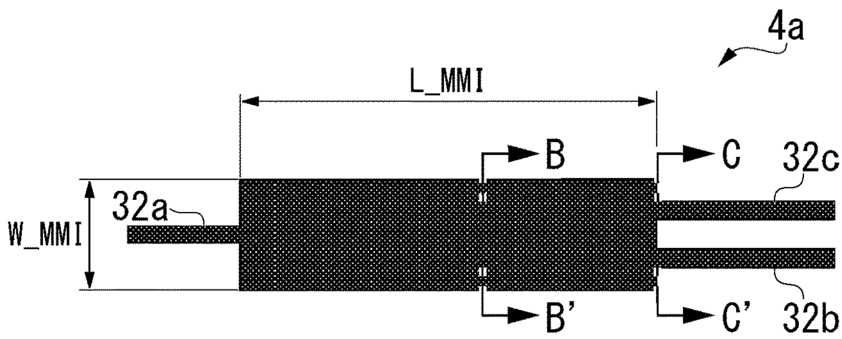
FIG. 2A is a plan view for describing a first multimode interference waveguide provided in the optical modulator shown in FIG. 1A.
Figure 2B:
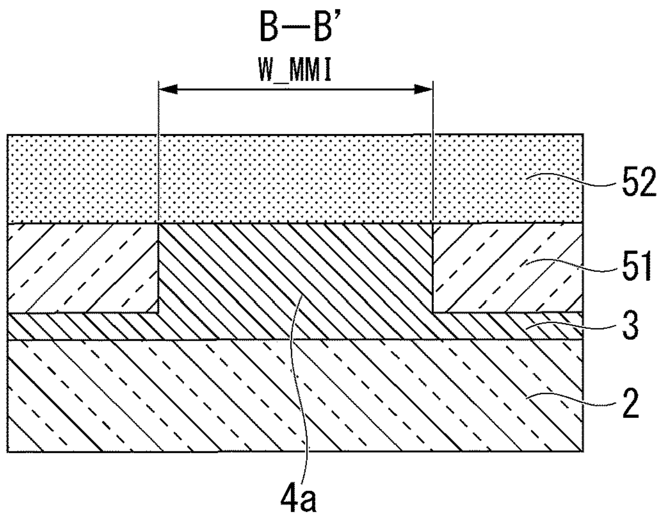
FIG. 2B is a cross-sectional view of the first multimode interference waveguide shown in FIG. 2A cut along line B-B' shown in FIG. 2A.
Figure 2C:
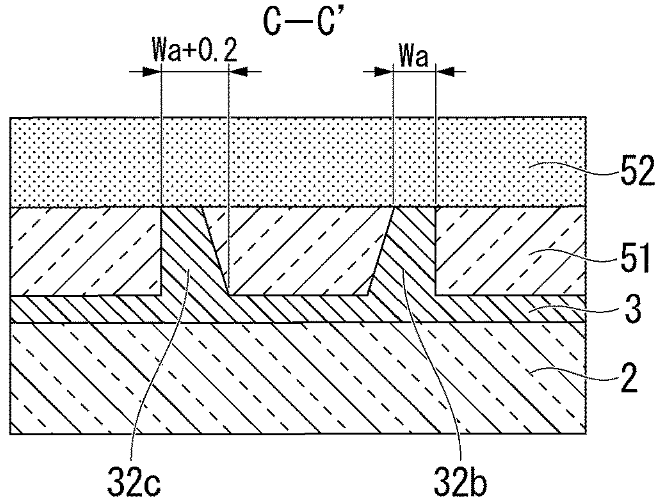
FIG. 2C is a cross-sectional view of the first multimode interference waveguide shown in FIG. 2A cut along line C-C' shown in FIG. 2A.

FIG. 2A is a plan view for describing the first multimode interference waveguide provided in the optical modulator shown in FIG. 1A. FIG. 2B is a cross-sectional view of the first multimode interference waveguide shown in FIG. 2A cut along line B-B' shown in FIG. 2A. FIG. 2C is a cross-sectional view of the first multimode interference waveguide shown in FIG. 2A cut along line C-C' shown in FIG. 2A.

As shown in FIGS. 2A to 2C, the first multimode interference waveguide 4*a* (or the second multimode interference waveguide 4*b*) has one end to which the main waveguide 32*a* (or the coupling waveguide 32*d* in the case of the second multimode interference waveguide 4*b*) is coupled and the other end to which the first optical branch waveguide 32*b* and the second optical branch waveguide 32*c* are coupled. The first multimode interference waveguide 4*a* (or the second multimode interference waveguide 4*b*) includes a ridge portion 32 of the optical waveguide layer 3 formed on the substrate 2, transmits a plurality of optical modes, and has a wider width (W_MMI) than the main waveguide 32*a* (or the coupling waveguide 32*d* in the case of the second multimode interference waveguide 4*b*).

The width (W_MMI) of the first multimode interference waveguide 4*a* (or the second multimode interference waveguide 4*b*) is appropriately determined in accordance with the width of the main waveguide 32*a* (or the coupling waveguide 32*d* in the case of the second multimode interference waveguide 4*b*), the wavelength of visible light input to the ridge portion 32, and the like. In the present embodiment, the width (W_MMI) of the first multimode interference waveguide 4*a* (or the second multimode interference waveguide 4*b*) provided in each of the ridge portions 32R, 32G, and 32B is all the same, but may be partially or wholly different.

In the present embodiment, the lengths (L_MMI) of the first multimode interference waveguide 4*a* and the second multimode interference waveguide 4*b* differ according to each of the ridge portions 32R, 32G, and 32B. Specifically, the lengths (L_MMI) of the first multimode interference waveguide 4*a* and the second multimode interference waveguide 4*b* are shorter when input light having a longer wavelength is transmitted. That is, in the present embodiment, the lengths (L_MMI) of the first multimode interference waveguide 4*a* and the second multimode interference waveguide 4*b* are the shortest for the ridge portion 32R to which red light is input, the second shortest for the ridge portion 32G to which green light is input, and the longest for the ridge portion 32B to which blue light is input.

In the present embodiment, the lengths (L_MMI) of the first multimode interference waveguide 4*a* and the second multimode interference waveguide 4*b* provided in each of the ridge portions 32R, 32G, and 32B can be determined, for example, based on the following Eq. (II). By determining the lengths (L_MMI) of the first multimode interference waveguide 4*a* and the second multimode interference waveguide 4*b* provided in each of the ridge portions 32R, 32G, and 32B on the basis of Eq. (II), the optical modulator 1 that can further reduce optical loss is obtained.

$$L = n_r W^2 / 2\lambda \quad \text{(II)}$$

In Eq. (II), L denotes the lengths (L_MMI) of the first multimode interference waveguide 4*a* and the second multimode interference waveguide 4*b*. $n_r$ denotes effective refractive indices of the first multimode interference waveguide 4*a* and the second multimode interference waveguide 4*b*. W denotes widths (W_MMI) of the first multimode interference waveguide 4*a* and the second multimode interference waveguide 4*b*.

(Protective Layer 51)

As shown in FIG. 1B, the protective layer 51 is arranged between the flat portion 31 of the optical waveguide layer 3 and the buffer layer 52. The protective layer 51 is made of a dielectric having a lower refractive index than the optical waveguide layer 3. As the material of the protective layer 51, for example, silicon oxide ($SiO_2$), aluminum oxide ($Al_2O_3$), lanthanum oxide ($La_2O_3$), a composite of these oxides, or the like can be used. Examples of the composite of the oxide include LaAlSiInO and the like. As the material of the protective layer 51, it is preferable to use silicon oxide ($SiO_2$) among the above oxides.

(Buffer Layer 52)

The buffer layer 52 prevents visible light propagating through the optical waveguide layer 3 from being absorbed by the electrode layer 6.

The buffer layer 52 is made of a dielectric having a lower refractive index than the optical waveguide layer 3. As the material of the buffer layer 52, for example, silicon oxide ($SiO_2$), aluminum oxide ($Al_2O_3$), lanthanum oxide ($La_2O_3$), or a composite of these oxides can be used.

Examples of the composite of the oxide include LaAlSiInO and the like. As the material for the buffer layer 52, LaAlSiInO among the above oxides is preferably used. The material of the buffer layer 52 may be the same as or different from that of the protective layer 51.

(Electrode Layer 6)

As shown in FIG. 1B, the electrode layer 6 is provided on the ridge portion 32 of the optical waveguide layer 3 via the buffer layer 52. As shown in FIGS. 1A and 1B, the electrode layer 6 includes a plurality of ground electrodes 61 having a belt shape in the plan view and a plurality of signal electrodes 62 having a belt shape in the plan view. As shown in FIG. 1A, the ground electrodes 61 are arranged on both sides in the width direction and the ground electrodes 61 and the signal electrodes 62 are arranged alternately in parallel.

As shown in FIGS. 1A and 1B, the ground electrode 61 has a wider shape than the signal electrode 62. The plurality of ground electrodes 61 provided in the electrode layer 6 are preferably electrically connected in a known method. This is because the potentials of the plurality of ground electrodes 61 can be made uniform and the high-frequency characteristics of the optical modulator 1 can be improved.

As shown in FIG. 1A, the ground electrode 61 is arranged at a position overlapping the first optical branch waveguide 32*b* provided in each of the ridge portions 32R, 32G, and 32B in the plan view.

A predetermined voltage is applied to the signal electrode 62 by a control device (not shown).

As shown in FIG. 1A, the signal electrode 62 is arranged at a position overlapping the second optical branch waveguide 32*c* provided in each of the ridge portions 32R, 32G, and 32B in the plan view.

In the present embodiment, because the electrode layer 6 has the plurality of ground electrodes 61 having a belt shape in the plan view and the plurality of signal electrodes 62 having a belt shape in the plan view, the ground electrode 61 is arranged at a position overlapping the first optical branch waveguide 32*b* provided in each of the ridge portions 32R, 32G, and 32B in the plan view, the signal electrode 62 is arranged at a position overlapping the second optical branch waveguide 32*c* provided in each of the ridge portions 32R, 32G, and 32B in the plan view, a half-wavelength phase modulation voltage value Vπ becomes low.

The half-wavelength phase modulation voltage value Vπ is a voltage value required for half-wavelength phase modulation for visible light input to each of the ridge portions 32R, 32G, and 32B and is a voltage value necessary to change the intensity of the visible light input to each of the ridge portions 32R, 32G, and 32B from a maximum value to a minimum value.

The optical modulator 1 of the present embodiment can shorten the length (interaction length) of the second optical branch waveguide 32*c* provided in each of the ridge portions 32R, 32G, and 32B arranged to overlap the signal electrode 62 in the plan view because the half-wavelength phase modulation voltage value Vπ is small. As a result, the optical modulator 1 of the present embodiment can reduce optical loss in the second optical branch waveguide 32*c* and can be miniaturized.

As the material of the electrode layer 6, for example, metals such as gold, silver, copper, platinum, tin, ruthenium, cobalt, tungsten, molybdenum, and indium, a compound of these metals, or the like can be used. As the material for the electrode layer 6, gold is preferably used.

<Manufacturing Method>

The optical modulator 1 of the present embodiment shown in FIGS. 1A and 1B can be manufactured, for example, in the method shown below.

First, the optical waveguide layer 3 made of a lithium niobate film is formed on the substrate 2.

As a method of forming the lithium niobate film on the substrate 2, for example, a thin film formation method such as a sputtering method, a CVD method, or a sol-gel method can be used.

When a single-crystal sapphire substrate is used as the substrate 2, the lithium niobate film may be epitaxially grown directly on the single-crystal sapphire substrate.

When a single-crystal silicon substrate is used as the substrate 2, the lithium niobate film may be formed in epitaxial growth via a cladding layer. As the cladding layer, one having a lower refractive index than the lithium niobate film and suitable for epitaxial growth is used. Specifically, as the cladding layer, for example, one made of $Y_2O_3$ can be used. A high-quality lithium niobate film can be formed by epitaxially growing the lithium niobate film via the cladding layer made of $Y_2O_3$ on the single-crystal silicon substrate.

Subsequently, the lithium niobate film obtained as described above is patterned into a desired shape using a known method such as a photolithography method. Thereby, the optical waveguide layer 3 having a plurality of flat portions 31 and n ridge portions 32 arranged between flat portions to be adjacent 31 is obtained.

Subsequently, the protective layer 51 is formed on the flat portion 31 of the optical waveguide layer 3 using, for example, a thin film formation method such as a sputtering method, a CVD method, or a sol-gel method.

Subsequently, the buffer layer 52 is formed to coat the protective layer 51 and the ridge portion 32 of the optical waveguide layer 3. As a method of forming the buffer layer 52, a known method can be used. Specifically, as the method of forming the buffer layer 52, for example, a thin film formation method such as a sputtering method, a CVD method, or a sol-gel method can be used.

Subsequently, the electrode layer 6 is formed on the buffer layer 52, for example, using the method as shown below.

First, a metal thin film is formed on the buffer layer 52 using, for example, a thin film formation method such as a vapor deposition method, a sputtering method, a CVD method, or a sol-gel method. Subsequently, a known method such as a photolithography method is used to pattern the metal thin film into a desired shape. Thereby, the electrode layer 6 having the plurality of ground electrodes 61 having the belt shape in the plan view and the plurality of signal electrodes 62 having the belt shape in the plan view is formed.

The electrode layer 6 may be formed using a method of forming a metal thin film by a method such as a vapor deposition or sputtering method via a mask having a desired shape.

According to the above steps, the optical modulator 1 of the present embodiment is obtained.

(Optical Modulation)

In the optical modulator 1 of the present embodiment shown in FIGS. 1A and 1B, the visible light input to the ridge portions 32R, 32G, and 32B is optically modulated as shown below.

First, as shown in FIG. 1A, visible light (red light, green light, and blue light) generated by a light source such as a laser element is input to the main waveguides 32*a* of the three ridge portions 32R, 32G, and 32B. The visible light input to the main waveguide 32*a* propagates from the main waveguide 32*a* to the first multimode interference (MMI) waveguide 4*a* and is branched into the first optical branch waveguide 32*b* and the second optical branch waveguide 32*c* through the first multimode interference waveguide 4*a*.

As shown in FIG. 1B, a predetermined voltage is applied from the signal electrode 62 to the second optical branch waveguide 32*c* via the buffer layer 52. Thereby, a phase difference occurs between the visible light propagating through the first optical branch waveguide 32*b* and the visible light propagating through the second optical branch waveguide 32*c*. Thereafter, visible light propagating through the first optical branch waveguide 32*b* and reaching the second multimode interference (MMI) waveguide 4*b* and visible light propagating through the second optical branch waveguide 32*c* and reaching the second multimode interference waveguide 4*b* are coupled through the second multimode interference waveguide 4*b*.

For example, when a phase difference between the visible light propagating through the first optical branch waveguide 32*b* and reaching the second multimode interference waveguide 4*b* and the visible light propagating through the second optical branch waveguide 32*c* and reaching the second multimode interference waveguide 4*b* is 0 or 360°, visible light beams coupled through the second multimode interference waveguide 4*b* strengthen each other and propagate through the coupling waveguide 32*d*.

On the other hand, when a phase difference between the visible light propagating through the first optical branch waveguide 32*b* and reaching the second multimode interference waveguide 4*b* and the visible light propagating through the second optical branch waveguide 32*c* and reaching the second multimode interference waveguide 4*b* is 180°, two visible light beams interferes with and cancels each other in the second multimode interference waveguide 4*b* and visible light does not propagate through the coupling waveguide 32*d*.

Thus, according to the phase difference generated between the visible light propagating through the first optical branch waveguide 32*b* and the visible light propagating through the second optical branch waveguide 32*c*, the second multimode interference waveguide 4*b* generates predetermined optically modulated light and externally outputs the generated light via the coupling waveguide 32*d*.

The optical modulator 1 of the present embodiment is a Mach-Zehnder-type optical modulator 1 having the substrate 2 and the optical waveguide layer 3 including the lithium niobate film formed on the substrate 2, and the optical waveguide layer 3 has four flat portions 31 and three ridge portions 32 arranged between flat portions to be adjacent 31. Also, each of the three ridge portions 32R, 32G, and 32B includes the main waveguide 32*a* to which visible light is input, the first multimode interference waveguide 4*a* through which the main waveguide 32*a* is branched into the first optical branch waveguide 32*b* and the second optical branch waveguide 32*c*, and the second multimode interference waveguide 4*b* through which the first optical branch waveguide 32*b* and the second optical branch waveguide 32*c* are coupled to form the coupling waveguide 32*d*. In such an optical modulator 1, visible light beams having different wavelengths are input to the three ridge portions 32. Also, the first multimode interference waveguide 4*a* and the second multimode interference waveguide 4*b* have shorter lengths as input light having a longer wavelength is transmitted. Thus, as compared with a case where lengths of the first multimode interference waveguide 4*a* and the second multimode interference waveguide 4*b* provided in each of the three ridge portions 32R, 32G, and 32B are the same, for example, the optical modulator 1 of the present embodiment reduces optical loss.

(Simulation)

In the optical modulator 1 of the present embodiment, Vπ*L [V*cm], which is a product of a voltage value (half-wavelength phase modulation voltage value) Vπ required for half-wavelength phase modulation of visible light input to each of the ridge portions 32R, 32G, and 32B and a length (interaction length) L of the second optical branch waveguide 32*c* of each of the ridge portions 32R, 32G, and 32B arranged to overlap the signal electrode 62 in the plan view, was calculated in a simulation process.

Also, the loss of the case where visible light input to each of the ridge portions 32R, 32G, and 32B was input to the first multimode interference waveguide 4*a* (=the second multimode interference waveguide 4*b*) provided in the optical modulator 1 of the present embodiment was calculated in a simulation process.

For the simulation, Finite difference method (FDM) solver of Firmware manufactured by Photon Design was used.

When the simulation was performed, the material and the dimensions of each member forming the optical modulator 1 were assumed as shown below.

The substrate 2 was a single-crystal sapphire substrate, the optical waveguide layer 3 was a lithium niobate film epitaxially grown directly on the single-crystal sapphire substrate, the protective layer 51 was silicon oxide ($SiO_2$), the buffer layer 52 was LaAlSiInO, and the electrode layer 6 was made of gold.

A thickness ($T_{slab}$) of the flat portion 31 of the optical waveguide layer 3 shown in FIG. 1B, a thickness ($T_{LN}$) of each of the ridge portions 32R, 32G, and 32B, a thickness ($T_{buffer}$) of the buffer layer 52, a thickness ($T_e$) of the electrode layer 6, a width ($W_e$) of the signal electrode 62, a distance (G) between the signal electrode 62 and the ground electrode 61, a distance(S) between a position of the width direction center on the buffer layer 52 side of the first optical branch waveguide 32*b* and a position of the width direction center on the buffer layer 52 side of the second optical branch waveguide 32*c*, and a width ($W_{LN}$) on the buffer layer 52 side of the first optical branch waveguide 32*b* and the second optical branch waveguide 32*c* are shown in Table 1.

TABLE 1

| | μm |
|---|---|
| $W_e$ | 2 |
| G | 2 |
| $T_e$ | 2 |
| $T_{buffer}$ | 0.7 |
| $T_{LN}$ | 0.7 |
| $T_{slab}$ | 0.15 |
| $W_{LN}$ | 0.8 |
| S | 4 |

Also, lengths (L_MMI) and widths (W_MMI) of the first multimode interference waveguide 4*a* and the second multimode interference waveguide 4*b* shown in FIGS. 2A to 2C and widths ($W_a$) on the buffer layer 52 side of the first optical branch waveguide 32*b* and the second optical branch waveguide 32*c* connected to the first multimode interference waveguide 4*a* and the second multimode interference waveguide 4*b* are shown in Table 2.

TABLE 2

| | Wavelength λ (nm) | L_MMI (μm) | W_MMI (μm) | Wa (μm) | Loss (dB) |
|---|---|---|---|---|---|
| R | 638 | 112 | 8.0 | 1.2 | 0.5 |
| G | 520 | 140 | 8.0 | 1.0 | 0.3 |
| B | 455 | 162 | 8.0 | 1.0 | 0.3 |
| G | 520 | 112 | 8.0 | 1.0 | 6.8 |
| B | 455 | 112 | 8.0 | 1.0 | 13.3 |
| R | 638 | 140 | 8.0 | 1.2 | 7.8 |
| B | 455 | 140 | 8.0 | 1.0 | 7.8 |
| R | 638 | 162 | 8.0 | 1.2 | 11.9 |
| G | 520 | 162 | 8.0 | 1.0 | 7.7 |

Table 2 shows a result of calculating the loss when RGB visible light having the center wavelength shown in Table 2 is input to the first multimode interference waveguide 4*a* (=the second multimode interference waveguide 4*b*) provided in the optical modulator 1 in a simulation process.

The length (L_MMI) 112 μm in the first multimode interference waveguide 4*a* (=the second multimode interference waveguide 4*b*) to which R (red light) of the center wavelength shown in Table 2 was input, the length (L_MMI) 140 μm in the first multimode interference waveguide 4*a* (=the second multimode interference waveguide 4*b*) to which G (green light) was input, and the length (L_MMI) 162 μm in the first multimode interference waveguide 4*a* (=the second multimode interference waveguide 4*b*) to which B (blue light) was input were lengths obtained in a simulation process in which the loss was minimized when the RGB visible light of the center wavelength shown in Table 2 was input.

As shown in Table 2, all losses of the case where R (red light) having the center wavelength shown in Table 2 was input to the first multimode interference waveguide 4*a* (=the second multimode interference waveguide 4*b*) having the length (L_MMI) 112 μm, G (green light) having the center wavelength shown in Table 2 was input to the first multimode interference waveguide 4*a* (=the second multimode interference waveguide 4*b*) having the length (L_MMI) 140 μm, and B (blue light) having the center wavelength shown in Table 2 was input to the first multimode interference waveguide 4*a* (=the second multimode interference waveguide 4*b*) having the length (L_MMI) 162 μm were sufficiently low.

On the other hand, for example, when RGB visible light having a center wavelength shown in Table 2 was input to the first multimode interference waveguide 4*a* (=the second multimode interference waveguide 4*b*) having the length (L_MMI) 112 μm, the losses of green light and blue light increased as shown in Table 2.

Also, for example, when RGB visible light having a center wavelength shown in Table 2 was input to the first multimode interference waveguide 4*a* (=the second multimode interference waveguide 4*b*) having the length (L_MMI) 140 μm, the losses of red light and blue light increased as shown in Table 2.

Also, for example, when RGB visible light having a center wavelength shown in Table 2 was input to the first multimode interference waveguide 4*a* (=the second multimode interference waveguide 4*b*) having the length (L_MMI) 162 μm, the losses of red light and green light increased as shown in Table 2.

Also, the center wavelength of visible light input to each of the ridge portions 32R, 32G, and 32B and Vπ*L [V*cm], which is a product of the half-wavelength phase modulation voltage value (Vπ) of each of the ridge portions 32R, 32G, and 32B and the interaction length (L) calculated in the simulation process, are shown in Table 3.

As shown in Table 3, Vπ*L [V*cm] in each of the ridge portions 32R, 32G, and 32B was a sufficiently small value. From this, it was confirmed that the optical modulator 1 of the present embodiment could suppress optical loss in the second optical branch waveguide 32*c* and could be miniaturized by shortening the interaction length (L).

TABLE 3

| | Wavelength λ (nm) | VπL (Vcm) |
|---|---|---|
| R | 638 | 0.8 |
| G | 520 | 0.7 |
| B | 455 | 0.6 |

Second Embodiment

Figure 3:
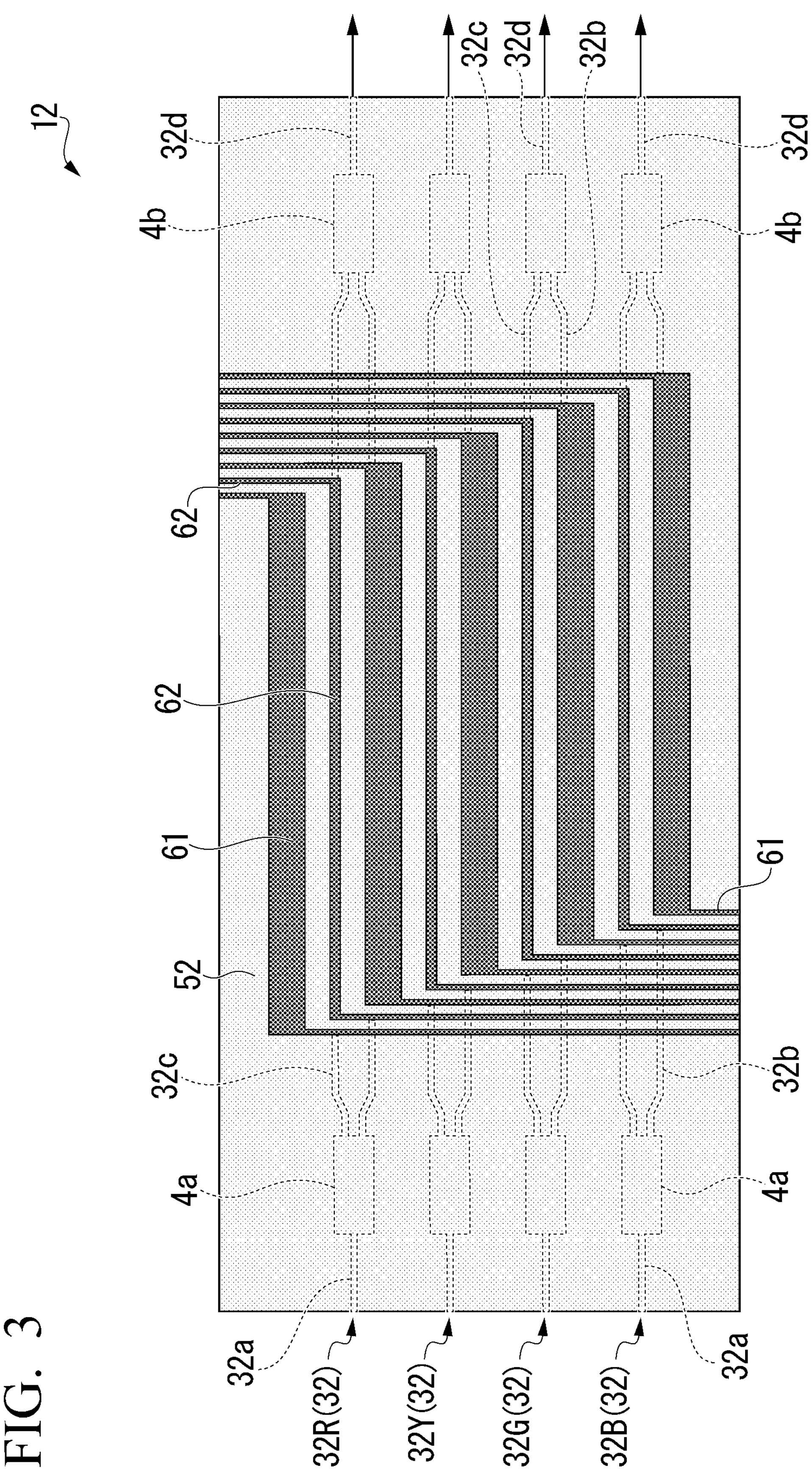
FIG. 3 is a plan view for describing an optical modulator of a second embodiment.

FIG. 3 is a plan view for describing an optical modulator of a second embodiment. An optical modulator 12 of the present embodiment is a Mach-Zehnder-type (MZI type) optical modulator.

In the optical modulator 12 of the second embodiment, members identical to those of the optical modulator 1 of the first embodiment described above are denoted by the same reference signs and description thereof will be omitted.

The optical modulator 12 according to the second embodiment is different from the optical modulator 1 of the first embodiment in that the number of ridge portions 32 of the optical waveguide layer 3 is 4. That is, the optical modulator 12 according to the second embodiment further includes a ridge portion 32Y in addition to the three ridge portions 32R, 32G, and 32B in the optical modulator 1 of the first embodiment.

Visible light beams having different wavelengths are input to the four ridge portions 32R, 32Y, 32G, and 32B in the second embodiment, respectively.

In the present embodiment, for example, red light having a peak wavelength of 610 nm or more and 750 nm or less is input to the ridge portion 32R. For example, yellow light having a peak wavelength of 565 nm or more and 600 nm or less is input to the ridge portion 32Y. For example, green light having a peak wavelength of 500 nm or more and 560 nm or less is input to the ridge portion 32G. For example, blue light having a peak wavelength of 435 nm or more and 480 nm or less is input to the ridge portion 32B.

In the optical modulator 12 of the second embodiment, the red light, the yellow light, the green light, and the blue light are input to the four ridge portions 32R, 32Y, 32G, and 32B, respectively. For this reason, the optical modulator 12 of the second embodiment can express a wider color gamut and can obtain a clearer image, for example, as compared with the case where only red light, green light, and blue light are input, like the optical modulator 1 of the first embodiment.

Visible light beams having different wavelengths are input to the four ridge portions 32R, 32Y, 32G, and 32B in the optical modulator 12 of the present embodiment. Also, the first multimode interference waveguide 4*a* and the second multimode interference waveguide 4*b* provided in each of the ridge portions 32R, 32Y, 32G, and 32B have shorter lengths as input light having a longer wavelength is transmitted. Thus, as compared with a case where lengths of the first multimode interference waveguide 4*a* and the second multimode interference waveguide 4*b* provided in the four ridge portions 32R, 32Y, 32G, and 32B are the same, for example, the optical modulator 12 of the present embodiment reduces optical loss.

Third Embodiment

Figure 4A:
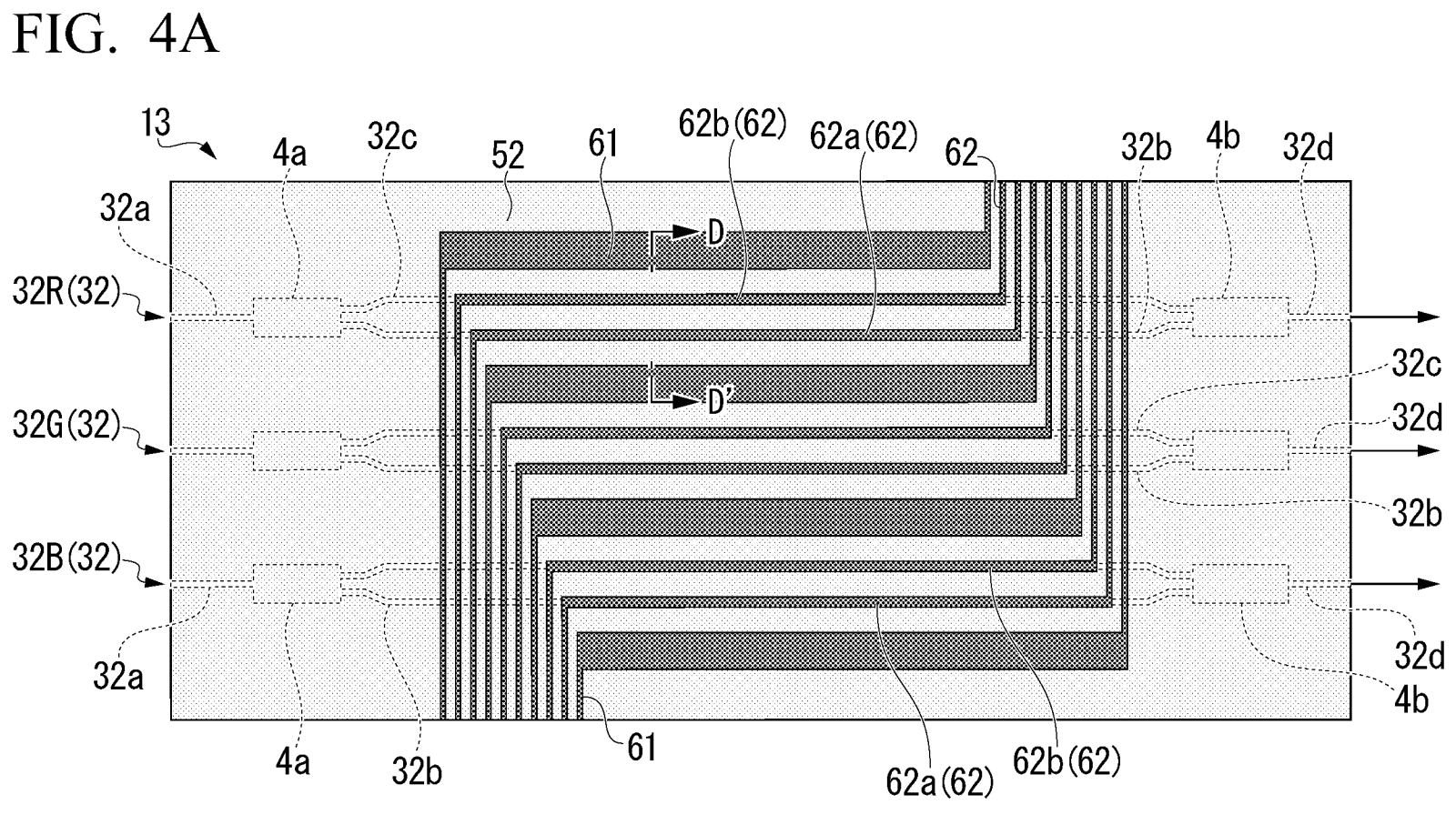
Figure 4B:
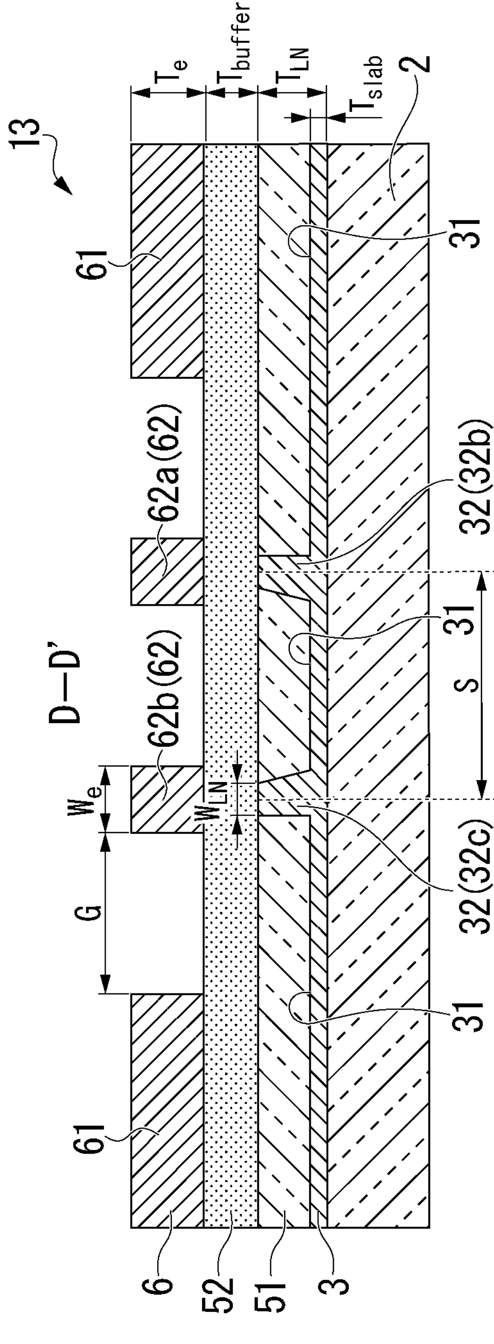
FIG. 4B is a cross-sectional view of the optical modulator shown in FIG. 4A cut along line D-D' shown in FIG. 4A.

FIG. 4A is a plan view for describing an optical modulator of a third embodiment. FIG. 4B is a cross-sectional view of the optical modulator shown in FIG. 4A cut along line D-D' shown in FIG. 4. An optical modulator 13 of the present embodiment is a Mach-Zehnder-type (MZI type) optical modulator.

In the optical modulator 13 of the third embodiment, members identical to those of the optical modulator 1 of the first embodiment described above are denoted by the same reference signs and description thereof will be omitted.

The optical modulator 13 according to the third embodiment is different from the optical modulator 1 of the first embodiment in that signal electrodes 62 having a belt shape in a plan view are arranged two by two between two or more ground electrodes 61 having a belt shape in the plan view provided in the electrode layer 6, a first signal electrode 62*a* is arranged at a position overlapping a first optical branch waveguide 32*b* provided in each of ridge portions 32R, 32G, and 32B in the plan view, and a second signal electrode 62*b* is arranged at a position overlapping a second optical branch waveguide 32*c* provided in each of the ridge portions 32R, 32G, and 32B in the plan view.

In the optical modulator 13 according to the third embodiment, a predetermined voltage is applied to each of the first signal electrode 62*a* and the second signal electrode 62*b* by a control device (not shown).

(Optical Modulation)

In the optical modulator 13 of the third embodiment shown in FIGS. 4A and 4B, visible light input to each of the ridge portions 32R, 32G, and 32B is optically modulated as shown below.

First, as shown in FIG. 4A, visible light beams (red light, green light, and blue light) generated by a light source such as a laser element are input to main waveguides 32*a* of the three ridge portions 32R, 32G, and 32B. The visible light input to the main waveguide 32*a* propagates from the main waveguide 32*a* to a first multimode interference (MMI) waveguide 4*a* and is branched into a first optical branch waveguide 32*b* and a second optical branch waveguide 32*c* through the first multimode interference waveguide 4*a*.

As shown in FIG. 4B, a predetermined voltage is applied from the signal electrode 62*a* to the first optical branch waveguide 32*b* via a buffer layer 52. Also, the predetermined voltage is applied from the signal electrode 62*b* to the second optical branch waveguide 32*c* via the buffer layer 52. Thereby, a phase difference occurs between the visible light propagating through the first optical branch waveguide 32*b* and the visible light propagating through the second optical branch waveguide 32*c*. Thereafter, visible light propagating through the first optical branch waveguide 32*b* and reaching the second multimode interference (MMI) waveguide 4*b* and visible light propagating through the second optical branch waveguide 32*c* and reaching the second multimode interference waveguide 4*b* are coupled through the second multimode interference waveguide 4*b*.

Thereby, in the optical modulator 13 of the third embodiment, the light optically modulated in the second multimode interference waveguide 4*b* is generated in accordance with the phase difference occurring between the visible light propagating through the first optical branch waveguide 32*b* and the visible light propagating through the second optical branch waveguide 32*c* and is externally output via the coupling waveguide 32*d*.

As is the case with the optical modulator 1 of the first embodiment, visible light beams having different wavelengths are input to the three ridge portions 32R, 32G, and 32B in the optical modulator 13 of the third embodiment. Also, the first multimode interference waveguide 4*a* and the second multimode interference waveguide 4*b* provided in each of the three ridge portions 32R, 32G, and 32B have shorter lengths as input light having a longer wavelength is transmitted. Thus, as compared with a case where lengths of the first multimode interference waveguide 4*a* and the second multimode interference waveguide 4*b* provided in each of the three ridge portions 32R, 32G, and 32B are the same, for example, the optical modulator 13 of the third embodiment reduces optical loss like the optical modulator 1 of the first embodiment.

(Simulation)

In the optical modulator 13 of the third embodiment, Vπ*L [V*cm], which was a product of a voltage value (half-wavelength phase modulation voltage value) Vπ required for half-wavelength phase modulation of visible light input to each of the ridge portions 32R, 32G, and 32B and a length (=a length of the second optical branch waveguide 32*c* of each of the ridge portions 32R, 32G, and 32B arranged to overlap the second signal electrode 62*b*) (interaction length) L of the first optical branch waveguide 32*b* of each of the ridge portions 32R, 32G, and 32B arranged to overlap the first signal electrode 62*a* in the plan view, was calculated in a simulation process.

The material of each member forming the optical modulator 13 when the simulation was performed was the same as that when the simulation was performed for the optical modulator 1 of the first embodiment. Also, when the simulation was performed, the dimensions of each part forming the optical modulator 13 was assumed as shown below.

A thickness ($T_{slab}$) of the flat portion 31 of the optical waveguide layer 3 shown in FIG. 4B, a thickness ($T_{LN}$) of the ridge portion 32, a thickness ($T_{buffer}$) of the buffer layer 52, a thickness ($T_e$) of the electrode layer 6, a width ($W_e$) of the first signal electrode 62*a* (=the second signal electrode 62*b*), a distance (G) between the first signal electrode 62*a* (=the second signal electrode 62*b*) and the ground electrode 61, a distance(S) between a position of the width direction center on the buffer layer 52 side of the first optical branch waveguide 32*b* and a position of the width direction center on the buffer layer 52 side of the second optical branch waveguide 32*c*, and a width ($W_{LN}$) on the buffer layer 52 side of the first optical branch waveguide 32*b* and the second optical branch waveguide 32*c* are shown in Table 4.

TABLE 4

| | μm |
|---|---|
| $W_e$ | 2 |
| G | 6 |
| $T_e$ | 2 |
| $T_{buffer}$ | 0.7 |

TABLE 4-continued

| | μm |
|---|---|
| $T_{LN}$ | 0.7 |
| $T_{slab}$ | 0.15 |
| $W_{LN}$ | 0.8 |
| S | 4 |

Also, lengths (L_MMI) and widths (W_MMI) of the first multimode interference (MMI) waveguide 4*a* and the second multimode interference waveguide 4*b* and a width ($W_a$) of the buffer layer 52 side of the first optical branch waveguide 32*b* and the second optical branch waveguide 32*c* connected to the first multimode interference waveguide 4*a* and the second multimode interference waveguide 4*b* were the same as those when the simulation was performed with respect to the optical modulator 1 of the first embodiment.

Table 5 shows the center wavelength of visible light input to each of the ridge portions 32R, 32G, and 32B and Vπ*L [V*cm], which is a product of the half-wavelength phase modulation voltage value (Vπ) of each of the ridge portions 32R, 32G, and 32B and an interaction length (L) calculated in a simulation process.

As shown in Table 5, Vπ*L [V*cm] at each of the ridge portions 32R, 32G, and 32B was a sufficiently small value. From this, it was confirmed that the optical modulator 13 of the third embodiment could suppress optical loss in the second optical branch waveguide 32*c* and could be miniaturized by shortening the interaction length (L).

TABLE 5

| | Wavelength λ (nm) | VπL (Vcm) |
|---|---|---|
| R | 638 | 0.9 |
| G | 520 | 0.7 |
| B | 455 | 0.6 |

Fourth Embodiment

Figure 5A:
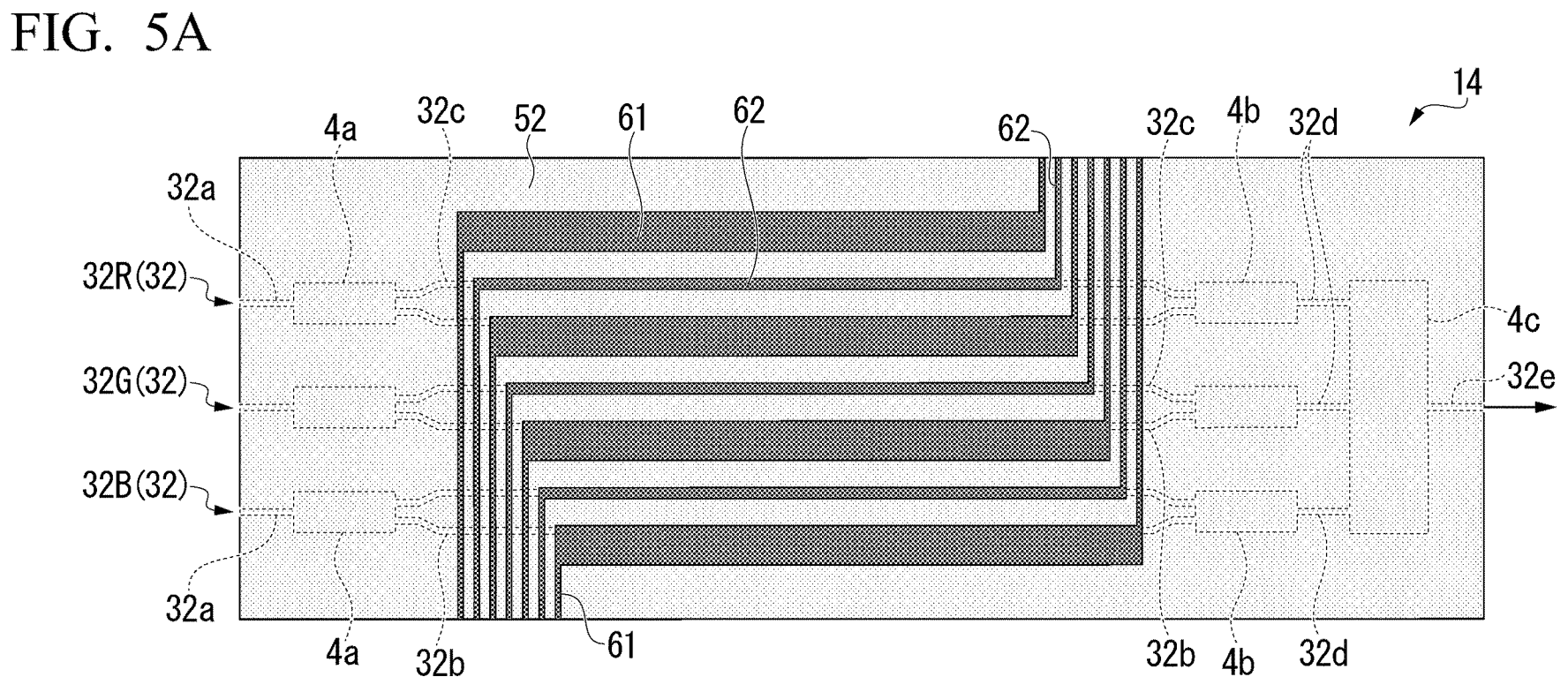
Figure 5B:
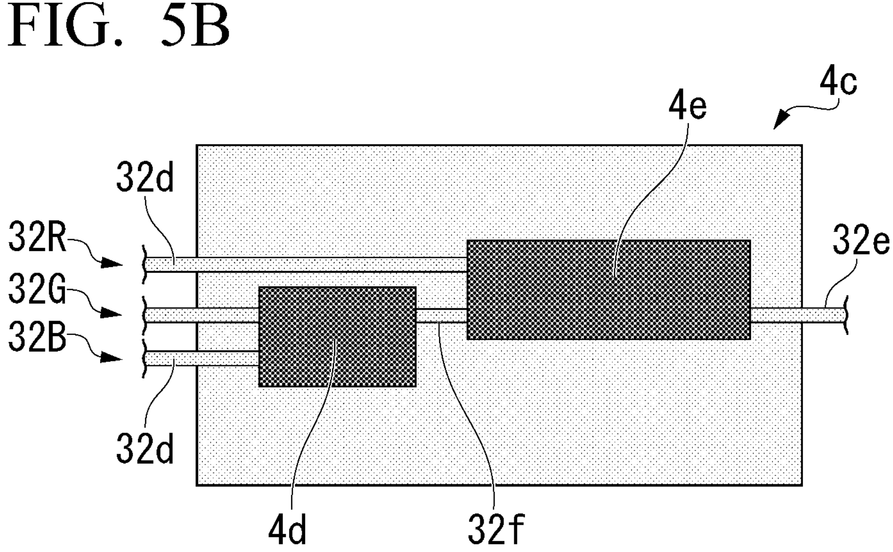
FIG. 5B is a plan view for describing an optical waveguide circuit provided in the optical modulator shown in FIG. 5A.

FIG. 5A is a plan view for describing an optical modulator of a fourth embodiment. An optical modulator 14 of the present embodiment is a Mach-Zehnder-type (MZI type) optical modulator. FIG. 5B is a plan view for describing an optical waveguide circuit 4*c* provided in the optical modulator shown in FIG. 5A.

In the optical modulator 14 of the fourth embodiment, members identical to those of the optical modulator 1 of the first embodiment described above are denoted by the same reference signs and description thereof will be omitted.

Unlike the optical modulator 1 of the first embodiment, the optical modulator 14 according to the fourth embodiment includes an optical waveguide circuit 4*c* on a substrate 2, and the optical waveguide circuit 4*c* couples coupling waveguides 32*d* of three ridge portions 32R, 32G, and 32B to form an output waveguide 32*e*.

Because the optical modulator 14 of the fourth embodiment includes the optical waveguide circuit 4*c*, optically modulated light beams propagating through the coupling waveguides 32*d* of the three ridge portions 32R, 32G, and 32B are coupled and output from the output waveguide 32*e*.

As the optical waveguide circuit 4*c*, it is only necessary to couple the coupling waveguides 32*d* provided in the plurality of ridge portions 32 (the ridge portions 32R, 32G, and 32B in FIGS. 5A and 5B) to form one output waveguide 32*e*. For example, a known waveguide such as a multimode interference waveguide, a directional coupler, or a Y-type coupling waveguide can be used.

In the optical modulator 14 of the present embodiment, the optical waveguide circuit 4*c* includes a third multimode interference waveguide 4*d* and a fourth multimode interference waveguide 4*e* formed in the optical waveguide layer 3 as shown in FIG. 5B. As shown in FIG. 5B, the coupling waveguides 32*d* of the ridge portions 32G and 32B are coupled to one end of the third multimode interference waveguide 4*d* and a GB coupling waveguide 32*f* to which they are coupled is coupled to the other end thereof. Also, the coupling waveguides 32*d* of the ridge portion 32R and the GB coupling waveguide 32*f* are coupled to one end of the fourth multimode interference waveguide 4*e* and the output waveguide 32*e* to which they are coupled is coupled to the other end thereof.

As is the case with the optical modulator 1 of the first embodiment, visible light beams having different wavelengths are input to the three ridge portions 32R, 32G, and 32B in the optical modulator 14 of the fourth embodiment. Also, the first multimode interference waveguide 4*a* and the second multimode interference waveguide 4*b* provided in each of the three ridge portions 32R, 32G, and 32B have shorter lengths as input light having a longer wavelength is transmitted. Thus, as compared with a case where lengths of the first multimode interference waveguide 4*a* and the second multimode interference waveguide 4*b* provided in each of the three ridge portions 32R, 32G, and 32B are the same, for example, the optical modulator 14 of the fourth embodiment reduces optical loss like the optical modulator 1 of the first embodiment.

Also, the optical modulator 14 of the fourth embodiment includes the optical waveguide circuit 4*c* on the substrate 2, and the optical waveguide circuit 4*c* couples the coupling waveguides 32*d* of the three ridge portions 32R, 32G, and 32B to form the output waveguide 32*e* as shown in FIGS. 5A and 5B. For this reason, for example, as compared with the case where the optical waveguide circuit 4*c* is formed on a substrate separate from the substrate 2 on which the three ridge portions 32R, 32G, and 32B are formed, it is possible to achieve miniaturization and optical loss reduction by enabling the length of the waveguide to be shortened, and it is possible to reduce optical loss by coupling the coupling waveguides 32*d* of the three ridge portions 32R, 32G, and 32B and the optical waveguide circuit 4*c* with butt coupling between waveguide end faces, spatial coupling through lenses, or other methods.

[Light Source Module]

Figure 6:
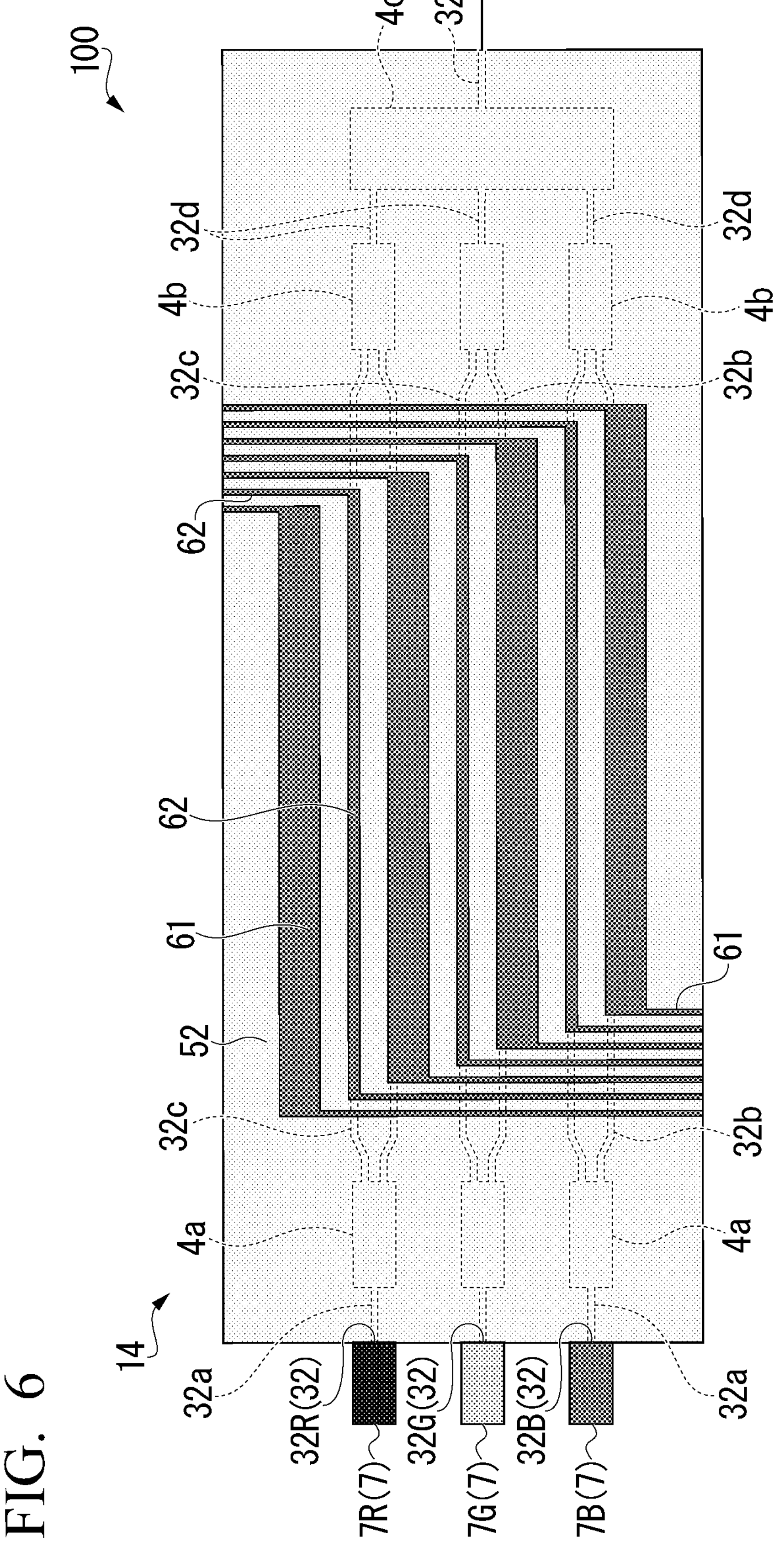
FIG. 6 is a plan view for describing a light source module including an optical modulator 14 of the fourth embodiment shown in FIGS. 5A and 5B.

Next, a light source module of the present invention will be described in detail with reference to the drawings. FIG. 6 is a plan view for describing a light source module including an optical modulator 14 of the fourth embodiment shown in FIGS. 5A and 5B. The light source module 100 of the present embodiment includes an optical modulator 14 of the fourth embodiment and a light source 7.

As shown in FIG. 6, the light source module 100 of the present embodiment includes three light sources 7R, 7G, and 7B. The light source 7R, 7G, and 7B output visible light beams input to the main waveguides 32*a* provided in the ridge portions 32R, 32G, and 32B in the optical waveguide layer 3 of the optical modulator 14. Specifically, the light source 7R emits red light. The light source 7G emits green light. The light source 7B emits blue light.

As the light sources 7R, 7G, and 7B, laser elements such as laser diodes (LDs) can be used, and various types of commercially available laser elements can be used.

Because the light source module 100 of the present embodiment includes the optical modulator 14 of the fourth embodiment, optical loss is reduced.

[Optical Engine and XR Glasses]

Figure 7:
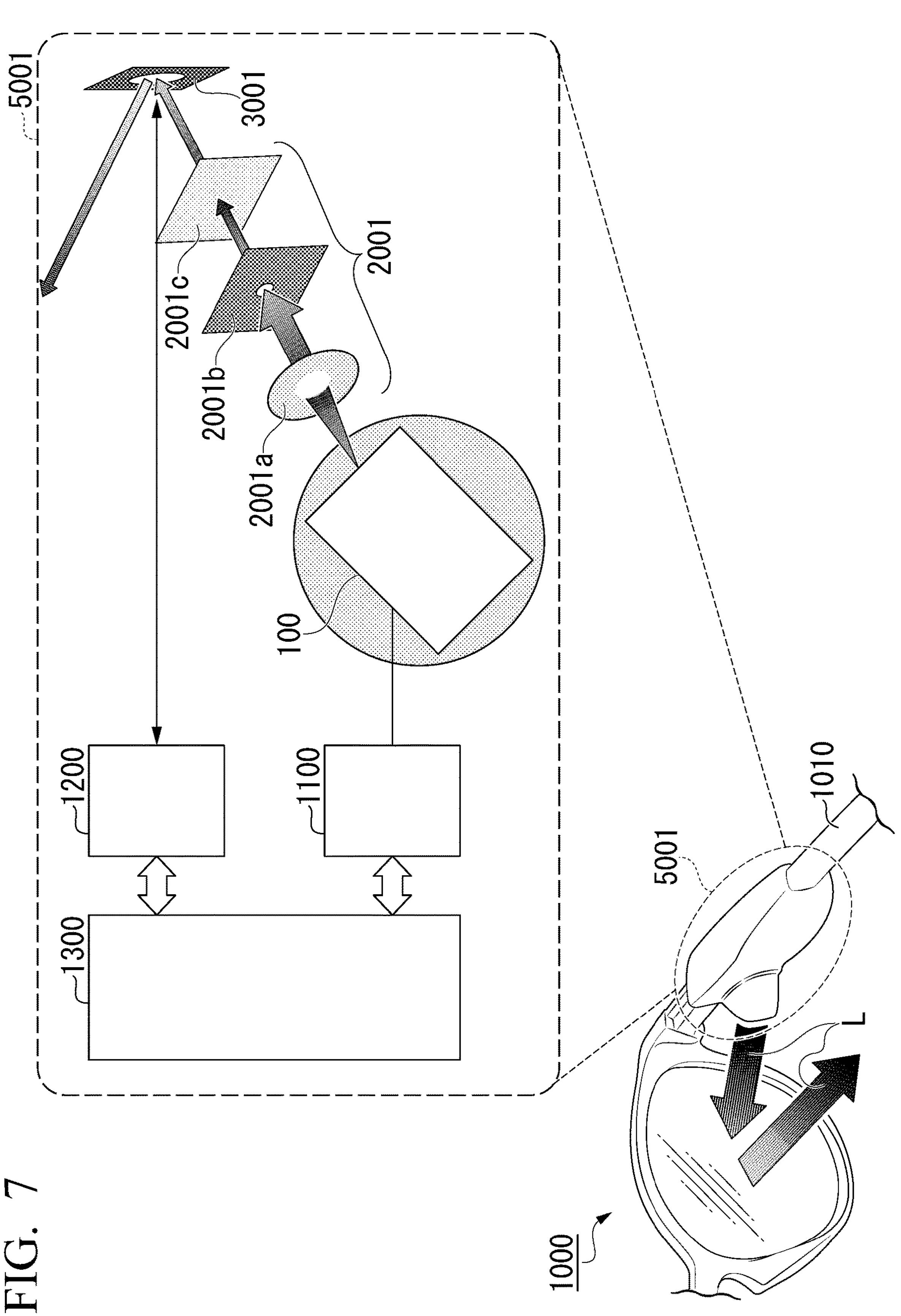
FIG. 7 is a conceptual diagram for describing an example of XR glasses of the present invention.
Figure 8:
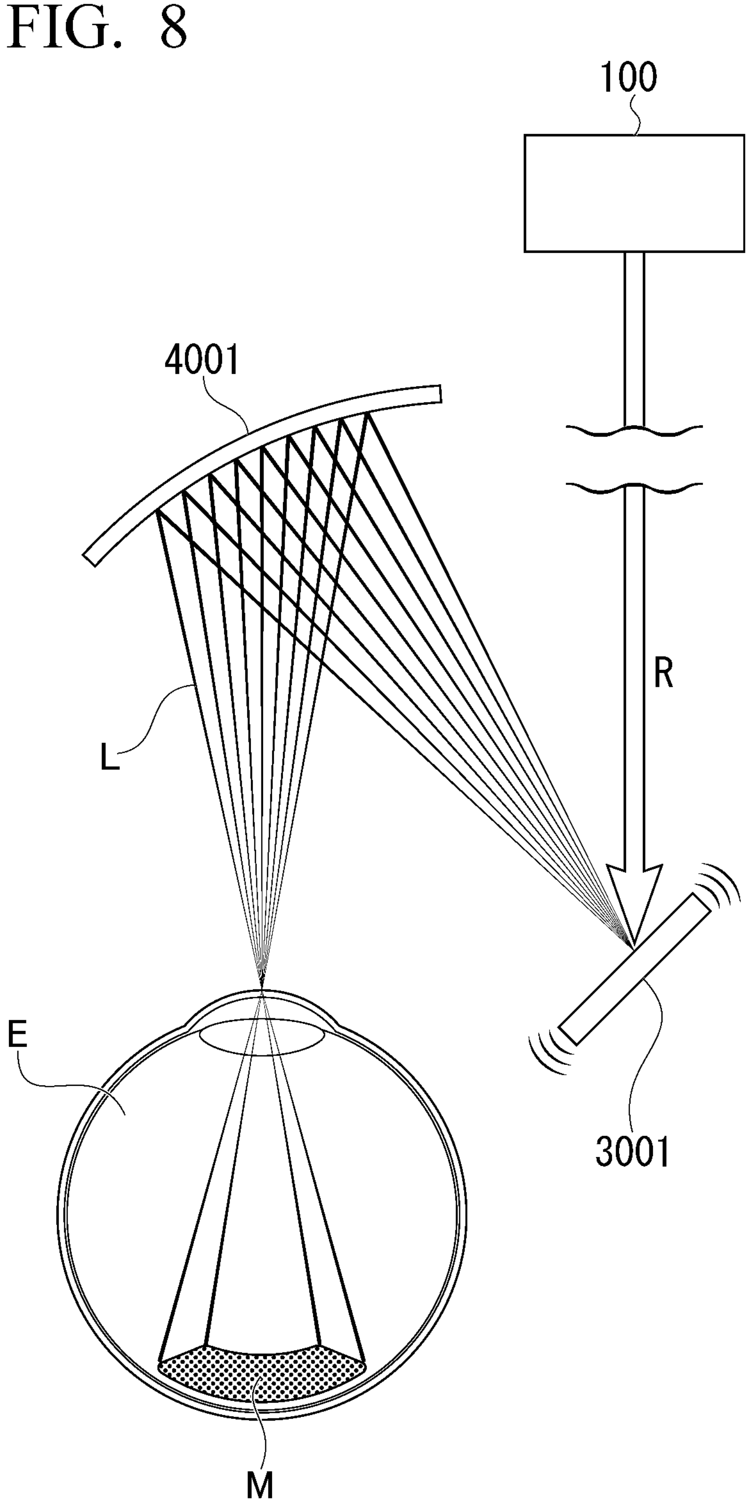
FIG. 8 is a conceptual diagram showing a state in which an image is projected directly onto a retina by light emitted from the light source module in the XR glasses shown in FIG. 7.

FIG. 7 is a conceptual diagram for describing an example of XR glasses of the present invention. FIG. 8 is a conceptual diagram showing a state in which an image is projected directly onto a retina by laser light output from the light source module in the XR glasses shown in FIG. 7.

XR glasses (glasses) 1000 of the present embodiment are a glasses-type terminal. XR is a general term for virtual reality (VR), augmented reality (AR), and mixed reality. Reference sign L shown in FIG. 8 denotes image display light.

In the XR glasses 1000 of the present embodiment shown in FIG. 7, a light source module 100 according to the above-described embodiment is mounted on an optical engine 5001 installed in a frame 1010.

As shown in FIG. 7, the optical engine 5001 includes a light source module 100, an optical scanning mirror 3001, an optical system 2001 connecting the light source module 100 and the optical scanning mirror 3001, a laser driver 1100, an optical scanning mirror driver 1200, and a video controller 1300 that controls these drivers.

As the optical scanning mirror 3001, for example, a MEMS mirror can be used. In order to project a 2D image, it is preferable to use a 2-axis MEMS mirror that vibrates to reflect laser light while changing angles in a horizontal direction (X-direction) and a vertical direction (Y-direction) as the optical scanning mirror 3001.

The optical system 2001 optically processes laser light emitted from the light source module 100. As the optical system 2001, for example, one having a collimator lens 2001*a*, a slit 2001*b*, and an ND filter 2001*c* can be used. The optical system 2001 shown in FIG. 7 is an example and may have other configurations.

In the XR glasses 1000 of an embodiment shown in FIG. 7, as shown in FIG. 8, laser light R emitted from the light source module 100 attached to the frame 1010 is reflected by the optical scanning mirror 3001 and is further reflected by a lens 4001 of the XR glasses 1000. The laser light R enters an eyeball E of a person as image display light L and it is possible to directly project an image (video) onto a retina M.

Because the XR glasses 1000 of the present embodiment are equipped with the light source module 100 of the present embodiment, optical loss is reduced.

Although embodiments of the present invention have been described in detail with reference to the drawings, configurations in the embodiments and combinations thereof are examples and the addition of, omission, replacement, and other changes of configurations are possible without departing from the features of the present invention.

For example, it is only necessary for the number of ridge portions provided in the optical waveguide layer of the optical modulator of the present invention to be two or more, and it is not limited to three or four.

Although an example in which the optical modulator 13 of the third embodiment and the optical modulator 14 according to the fourth embodiment described above have three ridge portions 32 as is the case with the optical modulator 1 of the first embodiment has been described, four ridge portions 32 may be provided as is the case with the optical modulator 12 of the second embodiment.

When the optical modulator 14 according to the fourth embodiment has four ridge portions 32, an optical waveguide circuit to which coupling waveguides of the four ridge portions are coupled to form an output waveguide is used.

Although the light source module 100 including the optical modulator 14 of the fourth embodiment has been described as an example in the above-described embodiment, it is only necessary for the optical modulator provided in the light source module of the present invention to be the optical modulator of the present invention. For example, any optical modulator selected from the optical modulators 1, 12, and 13 of the first to third embodiments may be provided instead of the optical modulator 14 of the fourth embodiment.

EXPLANATION OF REFERENCES

1, 12, 13, 14 Optical modulator
2 Substrate
3 Optical waveguide layer
4*a* First multimode interference waveguide
4*b* Second multimode interference waveguide
4*c* Optical waveguide circuit
6 Electrode layer
7, 7R, 7G, 7B Light source
31 Flat portion
32, 32R, 32Y, 32G, 32B Ridge portion
32*a* Main waveguide
32*b* First optical branch waveguide
32*c* Second optical branch waveguide
32*d* Coupling waveguide
32*e* Output waveguide
51 Protective layer
52 Buffer layer
61 Ground electrode
62 Signal electrode
62*a* First signal electrode
62*b* Second signal electrode
100 Light source module
1000 XR glasses (glasses)
1010 Frame
1100 Laser driver
1200 Optical scanning mirror driver
1300 Video controller
2001 Optical system
2001*a* Collimator lens
2001*b* Slit
2001*c* ND filter
3001 Optical scanning mirror
4001 Lens
5001 Optical engine

What is claimed is:

1. An optical modulator, which is a Mach-Zehnder-type optical modulator comprising: a substrate; and an optical waveguide layer including a lithium niobate film formed on the substrate, wherein the optical waveguide layer includes a plurality of flat portions and n ridge portions arranged between the flat portions to be adjacent, where n is an integer of two or more, wherein each of the n ridge portions includes a main waveguide to which a visible light beam is input, a first multimode interference waveguide through which the main waveguide is branched into a first optical branch waveguide and a second optical branch waveguide, and a second multimode interference waveguide through which the first optical branch waveguide and the second optical branch waveguide are coupled to form a coupling waveguide, wherein the visible light beams have different wavelengths and are input to the n ridge portions, wherein, for any two of the n ridge portions, the first and second multimode interference waveguides with shorter lengths are designed for the input visible light beam having the longer wavelength, wherein the n ridge portions include a first ridge portion and a second ridge portion, the first ridge portion includes first and second multimode interference waveguides having a first length and the second ridge portion includes first and second multimode interference waveguides having a second length shorter than the first length, and the second ridge portion is configured for visible light having a longer wavelength than the first ridge portion, and wherein the optical modulator further comprises a waveguide circuit to which at least two of the coupling waveguides of the n ridge portions are coupled on the substrate to form an output waveguide, wherein the waveguide circuit includes at least one multimode interference waveguide configured to couple the at least two of the coupling waveguides.

2. The optical modulator according to claim 1, wherein n is 3.

3. The optical modulator according to claim 1, wherein an electrode layer is provided on the optical waveguide layer, wherein the electrode layer includes a plurality of ground electrodes having a belt shape in a plan view and a plurality of signal electrodes having a belt shape in the plan view, wherein the ground electrode is arranged at a position overlapping the first optical branch waveguide in the plan view, and wherein the signal electrode is arranged at a position overlapping the second optical branch waveguide in the plan view.

4. The optical modulator according to claim 1, wherein an electrode layer is provided on the optical waveguide layer, wherein the electrode layer includes a plurality of first signal electrodes having a belt shape in a plan view and a plurality of second signal electrodes having a belt shape in the plan view, wherein the first signal electrode is arranged at a position overlapping the first optical branch waveguide in the plan view, and wherein the second signal electrode is arranged at a position overlapping the second optical branch waveguide in the plan view.

5. A light source module comprising:

the optical modulator according to claim 1; and a light source configured to output visible light input to the main waveguide of the optical modulator.

6. An optical engine comprising the light source module according to claim 5.

7. XR glasses comprising the light source module according to claim 5.

* * * * *